United States Patent

Guiriec

[11] Patent Number: 4,480,993
[45] Date of Patent: Nov. 6, 1984

[54] INSTALLATION FOR PROCESSING CHUNKS OF ANIMAL MATTER

[75] Inventor: Gérard Guiriec, Quimper, France

[73] Assignees: Alsthom-Atlantique Semada, Paris; Societe Industrielle Lorientaise (S.I.L.), Lorient, both of France

[21] Appl. No.: 469,052

[22] Filed: Feb. 23, 1983

[30] Foreign Application Priority Data

Oct. 26, 1982 [FR] France ............................. 82 17872

[51] Int. Cl.³ .................... B01D 1/00; F27B 19/00
[52] U.S. Cl. ................... 432/266; 422/285; 422/307; 426/417
[58] Field of Search ............... 432/266; 422/285, 307; 426/417

[56] References Cited

U.S. PATENT DOCUMENTS 848,268  3/1907  Smith ............................... 422/307
3,263,592  8/1966  Hickey et al. .................... 422/285

Primary Examiner—John J. Camby
Attorney, Agent, or Firm—Sughrue, Mion, Zinn, Macpeak and Seas

[57] ABSTRACT

Chunks of animal matter with 60% moisture content are fed into a cooker (1) via an inlet (3). Steam at 150° C. is fed into a double skin via an inlet (6) and condenses to leave as water via an outlet (7). The application of heat to the animal matter causes greasy steam to be given off therefrom which leaves the cooker via an outlet (10). The remaining animal solids leave the cooker via an outlet (4) where they have a moisture content of 10%. The greasy steam is condensed in a condenser (19) and greasy steam condensate is discarded via an overflow (36). In the present installation, the major portion of the heat released by condensing the greasy steam is recovered and recycled, thereby reducing the energy requirements of the installation as a whole. This is achieved as follows: a portion of the greasy steam condensate is recycled via a heat exchanger (22) to be sprayed back into the condenser as the condenser cooling fluid; clean water is taken from a flash bottle (26) to act as the cooling liquid in the heat exchanger. After heating it is recycled into the steam in the flash bottle. Flash bottle steam is brought up to heating steam temperature and pressure in a compressor set (24), whence it is fed to the cooker. Condensed heating steam from the cooker is recycled into the water of the flash bottle.

3 Claims, 2 Drawing Figures

INSTALLATION FOR PROCESSING CHUNKS OF ANIMAL MATTER

BACKGROUND OF THE INVENTION

In knackers' yards, animal carcasses are cut up into chunks of flesh and bone that are about 30 mm a side. The chunks have an average moisture content of about 60%, and they are fed into a cooker where they loose a large part of their moisture, leaving the cooker as a kind of flour with about 10% moisture content. The cooker comprises an oven which is heated by steam at 150° C. The heating steam is produced in a boiler which burns fuel oil. The moisture given off from the animal matter fed into the cooker leaves the cooker in the form of greasy steam which is condensed in a condenser using cooling water which is itself cooled, after passing through the condenser, by means of an air cooler. The water condensed in the condenser is extremely dirty and is disposed of via the sewers. In an installation of this type, the heat in the greasy steam is simply lost to the atmosphere in the air leaving the air cooler. A great deal of heat is thus lost condensing the greasy steam.

Preferred embodiments of the present invention recover a considerable portion of the latent heat in the greasy steam given off by heated animal matter.

SUMMARY OF THE INVENTION

The present invention provides an installation for processing chunks of animal matter, the installation comprising: a cooler having an inlet for said chunks of animal matter, an outlet for treated matter, an outlet for greasy steam given off by the matter during processing, an inlet for heating steam, and an outlet for condensed heating steam; and a condenser connected to receive the greasy steam given off from the processed matter, said condenser having an overflow outlet for the condensate from said greasy steam, the improvement wherein said condenser uses a portion of its own condensate as a cooling fluid, said portion being passed through a heat exchanger where it is cooled before being recycled through the condenser, said heat being transfered in the heat exchanger to clean water which is fed after receiving said heat to the vapour phase portion of a flash bottle, steam from said flash bottle being supplied to a compressor set having an outlet which supplies said heating steam to the cooker, said condensed heating steam being recycled to the liquid phase of said flash bottle, and said heat exchanger taking its supply of cooling water from said liquid phase.

Preferably, the condenser cooling fluid which is constituted by a portion of its own condensate, is sprayed into the condenser whereby the heat exchange surface area between the cooling fluid and the greasy steam is constituted by the surface of the spray droplets.

It is also advantageous for said compressor set to comprise a plurality of stages, with the outlet from at least one of the stages other than the last stage being connected to the inlet of the next stage via a bottle for preventing overheating, said bottle receiving a portion of the condensed heating steam form the cooker, and said compressor stage outlet being connected to bubble through the condensed steam in said bottle, with the next compressor stage being fed with steam from said bottle.

BRIEF DESCRIPTION OF THE DRAWINGS

An embodiment of the invention is described by way of example with reference to the accompanying drawings, in which.

MORE DETAILED DESCRIPTION

Figure 1:
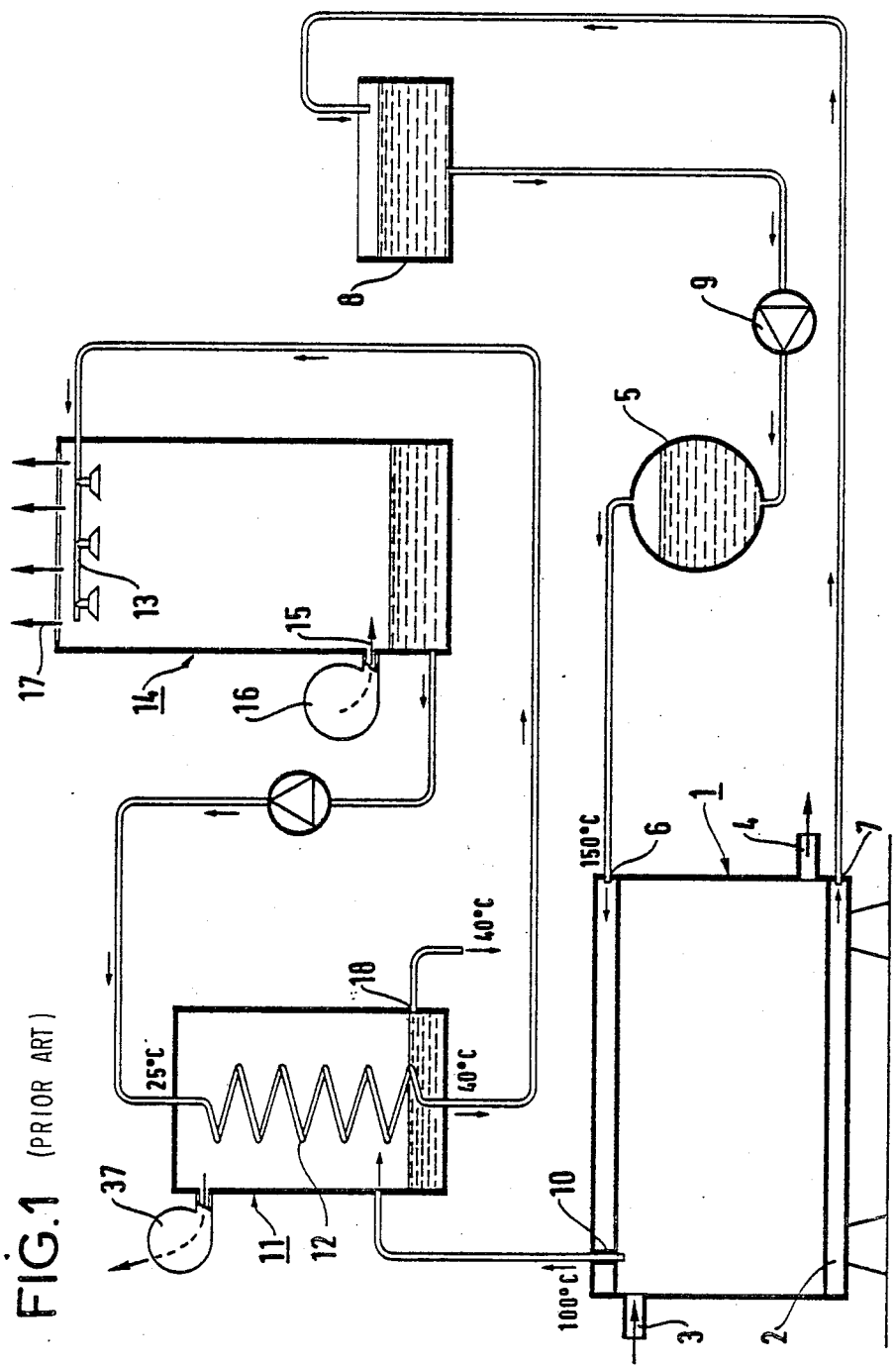
FIG. 1 is a schematic diagram of a prior art installation.

The prior art installation shown in FIG. 1 comprises a conventionally designed cooker 1 which is heated by steam at 150° C. The cooker has a double skin through which the heating steam flows and it also has a heating rotor including a circuit for the steam. To simplify the drawing, the rotor is not shown, but a hollow space 2 for steam flow is shown between two skins.

The cooker 1 has an inlet 3 for animal matter with an average 60% moisture content, and an outlet 4 through which the processed matter leaves in the form of a kind of flour having a 10% moisture content. The heating steam at 150° C. is produced in a boiler 5, it enters the cooker via an inlet 6 and leaves via an outlet 7 whence it is conveyed to a water tank 8. A pump 9 feeds water from the tank 8 to the boiler 5. Matter 3 arrives continuously. The greasy steam given off by the matter as it passes through the cooker, leaves via an outlet 10 and is fed to a condenser 11 which is cooled by a water circuit 12. The heated cooling water is fed to a spray bank 13 in an air cooler 14 having an air inlet 15 supplied by a fan 16, and having a top outlet 17 for saturated air.

The condenser 11 has an overflow outlet 18 via which the condensate from the greasy steam flows out to be disposed of via the sewers. The non-condensing portion of said steam is extracted by an extractor fan 37.

Thus, after leaving the cooker 1, the greasy steam looses its heat to the cooling circuit 12 which then dumps it as a complete loss to the atmosphere in the air cooler 14.

Figure 2:
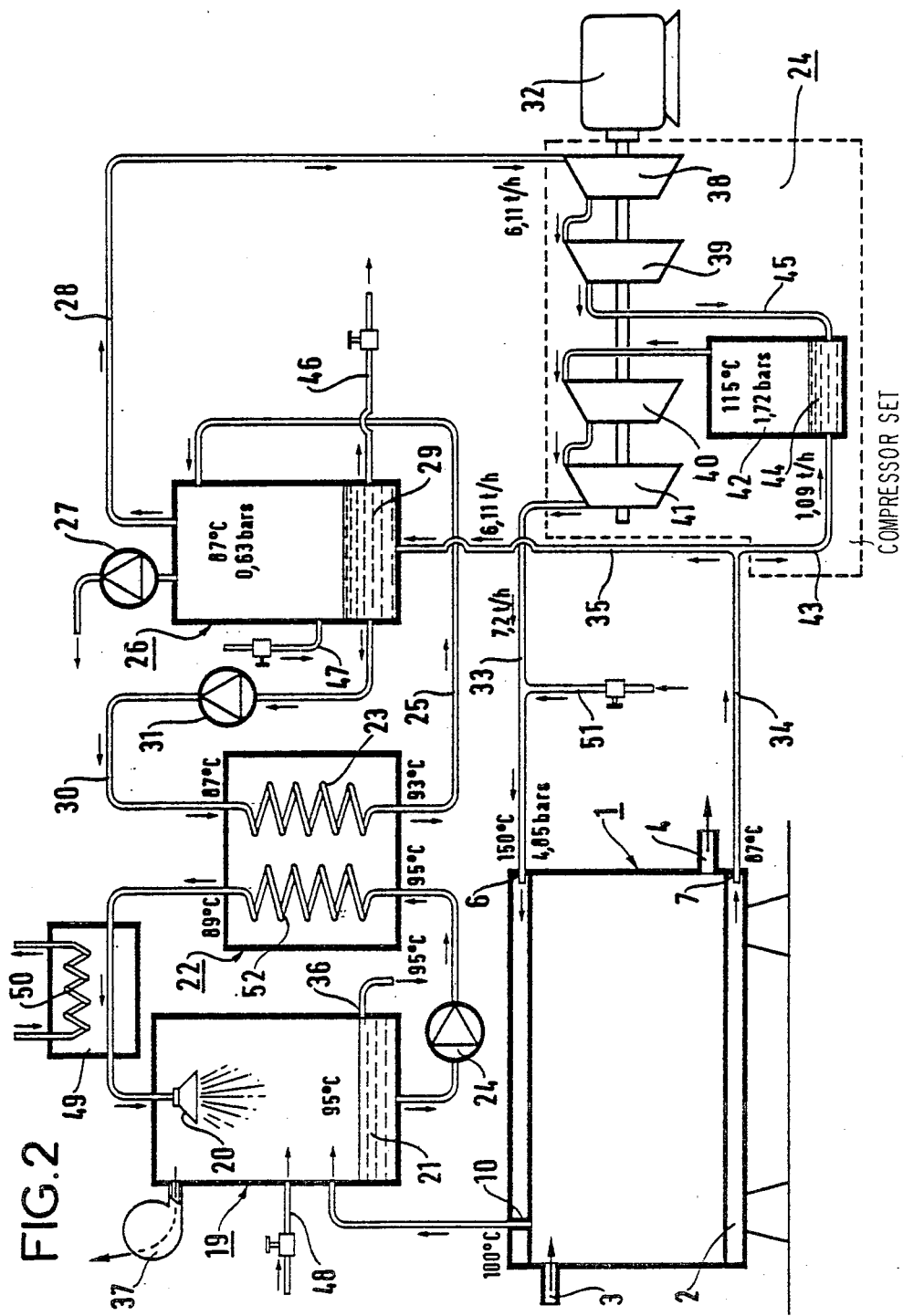
FIG. 2 is a similar schematic diagram of an installation in accordance with the invention.

FIG. 2 shows in installation in accordance with the invention, which uses an identical cooker 1, but which the greasy steam at 100° C. given off inside the cooker by the matter being processed is condensed in a spray condenser 19. The spray condenser 19 has a spray head 20 from which cooling liquid is sprayed at 89° C. The cooling liquid is constituted by a portion of the 95° C. condensate 21 from the greasy steam, after a further cooling stage in a heat exchanger 22 where it is cooled from 95° C. to 89° C. The heat exchanger 22 has a primary circuit or coil 52 in which the condensate is cooled, and a secondary circuit 23 which absorbs heat from the primary circuit. A pump 24 circulates the condensate 21 through the heat exchanger 22 and thus on to the spray head 20.

A heat exchanger with conventional heat exchange surfaces instead of the spray heat exchanger 19 would require a huge exchange surface area and would not be reliable in the long term. The problem is that the greasy steam to be condensed entrains particles of flour and fat which would rapidly coat the heat exchange surfaces, whereas in a spray heat exchanger the heat exchange surface area is constituted by the surface area of the spray droplets. This area remains substantially constant in use as does its heat exchange coefficient, thereby ensuring that operating temperatures remain constant.

Thus in an installation in accordance with the invention, the heat given off by condensing the greasy steam to a highly impure fluid is transfered to the secondary circuit or coil 23 of the heat exchanger 22. Clean water suitable for use in a compressor set 24 flows through the secondary circuit 23.

Water leaving the secondary circuit 23 of the heat exchanger 22 is conveyed by a pipe 25 to the top of a flash bottle 26 which is dept at low pressure by a vacuum pump 27. The water thus expands by vaporizing partially, with the resulting low pressure steam being conveyed by a pipe 28 to the inlet of the compressor set 24. The inlet side of the secondary circuit 23 of the heat exchanger 22 is supplied with condensate water 29 from the flash bottle 26 via a pipe 30 and a pump 31. The compressor set 24 is driven by an electric motor 32 which supplies the energy required for raising the thermodynamic level of the steam at the outlet of the flash bottle 26 from 87° C. and 0.63 bars pressure to 150° C. and 4.85 bars at the outlet from the compressor set. A pipe 33 then takes the 150° C. steam to the cooker 1.

At the heating fluid outlet from the cooker 1, the condensed heating fluid leaves at 87° C. and is fed via pipes 34 and 35 to the liquid phase side of the flash bottle 26.

The spray condenser 19 further includes an overflow outlet 36 via which the condensed greasy steam is sent to the sewers, and an outlet with an extractor fan 37 for the incondensible portion of the greasy steam.

The compressor set has four centrifugal compressor stages 38, 39, 40 and 41, and a bottle 42 for avoiding overheating. The bottle 42 is fed with water at 87° C. from the cooker outlet via a pipe 43, and with steam which is taken from the second stage 39 via a pipe 45 and which is bubbled through the water 44 inside the bottle 42. The steam inside the bottle 42 is at 115° C. and 1.72 bars and is fed to the inlet of the third centrifugal compressor stage 40.

Via its inlet 3, the cooker 1 receives 11 tonnes (metric tons) per hour of matter at 15° C. and with a 60% moisture content. At its outlet 4 it delivers 4.89 tonnes per hour of a product which has 10% moisture content, and at its outlet 10 it delivers 6.11 tonnes per hour of greasy steam at 100° C.

Heating fluid is applied to the inlet 6 of the cooker at a rate of 7.2 tonnes per hour of steam at 150° C. and 4.85 bars pressure, and 6.11 tonnes per hour of the condensate water is fed to the flash bottle 26 while the remaining 1.09 tonnes per hour is fed to the bottle 42 for avoiding overheating.

Water enters the secondary circuit 23 of the heat exchanger 22 at 87° C. and leaves at 93° C.

The heat received per hour by the cooker 1 is as follows: 4,092 thermal units from the heating fluid (where one thermal unit is the heat required to raise on tonne of water through 1° C., ie. 1 megacalorie or about 4.2 megajoules), plus 132 thermal units from the input matter, giving a total of 4,226 thermal units. This heat leaves the cooker as follows: 123 thermal units heat lost from the cooker, 196 thermal units output in the flour leaving via the outlet 4, and 3,905 thermal units in the greasy steam given off by the cooking process. Of said 3,905 thermal units, 3,324 are recovered at the outlet from the flash bottle 26.

Given that the motor 32 looses 43 thermal units, that the compressor set looses 41 thermal units, and that the heating fluid gives 4,092 thermal units to the cooker, there is a total of 4,176 thermal units to be supplied. However, 3,324 thermal units are recovered by the flash bottle 26, so the net heat input requirement is 4,176−3,324=852 thermal units, which is supplied as electricity to the motor 32.

Thus only 852 external thermal units need to be supplied per hour to the installation of FIG. 2, whereas the prior art installation shown in FIG. 1 needs the full 4,092 thermal units to be supplied from an external source.

Naturally the figures given in the above worked example, are given merely by way of example, and can readily be scaled up or down depending on requirements.

To start the installation, steam is supplied from a boiler via a pipe 51, and the flash bottle 26 feeds water via a pipe 46 to the boiler's supply tank. Likewise, a pipe 47 is provided to set up the circuit 29, 30, 23, and 25 with water, and a pipe 48 supplies water initially to the circit of the spray cooler 19. Finally, in the event of a failure of the compressor set 24, and possibly during starting up as well, a heat exchanger 49 in the spray cooler's circuit enables heat to be removed via a secondary circuit 50 connected to an air cooler which is not shown, but which is similar to the cooler 14 shown in FIG. 1. Cooling water enters the heat exchanger 49 at 30° C. and leaves at 50° C. flowing at 166 m³/h.

Naturally, the above start up devices are turned off once the installation is running properly, with the heat exchanger 49 being ready on stand-by for use in an emergency.

In the heat exchanger 22, the same flow occurs both in the primary 52 and in the secondary 23, namely 554 m³/h. The emergency heat exchanger 49 only needs to have a flow of 166 m³/h through its secondary 50 since it has a much higher temperature difference between inlet and outlet (20° C. than does its primary which only needs to have a temperature difference of 6° C.

Losses of steam from the installation are compensated by topping up the flash bottle from a device having a constant level float.

I claim:

1. An installation for processing chunks of animal matter, said installation comprising:

a double wall cooker defining an oven surrounded by a steam heating chamber, said oven having an inlet for receiving said chunks of animal matter, an outlet for treated matter and an outlet for greasy steam given off by the matter during processing, said steam heating chamber having an inlet for receiving heating steam and an outlet for removing condensed heating steam; and a condenser connected to said oven greasy steam outlet to receive the greasy steam given off from the processed matter and within which condenser said greasy steam condenses to form a condensate, said condenser having an overflow outlet for the condensate from said greasy steam, the improvement comprising:

means for circulating and cooling a portion of said condenser's own condensate for use as a cooling fluid, said means for circulating and cooling said condenser condensate comprising a heat exchanger having a primary coil and a secondary coil, a flash bottle having clean water both in the liquid phase and in the vapour phase and being connected to the heat exchanger secondary soil, means for passing said portion of said greasy steam condensate through said primary coil of said heat exchanger, means for pumping said clean water from said flash bottle through said secondary coil of said heat exchanger to cool said portion of said greasy steam condensate such that the cooled condensate is recycled as a cooling fluid for the condenser and said clean water from the liquid phase of the flash bottle is circulated through said secondary coil and returned to the flash bottle, a compressor set having an inlet and an outlet, and means for connecting said flash bottle, at said vapour phase, to the inlet of said compressor set to take low pressure steam constituting the vapour phase of the flash bottle and compressing it to produce said heating steam, and means for connecting the outlet of said compressor set to the inlet of said heating chamber of said cooker, and means for recycling condensed heating steam from the steam heating chamber outlet of said to the flash bottle at said liquid phase.

2. An installation according to claim 1, wherein means for circulating and cooling said portion of said greasy steam condensate comprises means for spraying said portion of greasy steam condensate after cooling into the condenser, above the level of condensate therein such that the heat exchange surface area between the cooling fluid and the greasy steam is constituted by the surface of the spray droplets of said cooled portion of condensate.

3. An installation according to claim 2, wherein said compressor set comprises a plurality of compressor stages, and wherein each stage has an inlet and an outlet, the outlet from at least one of the stages other than the last stage being connected to the inlet of the next stage via an overheating avoidance bottle, and said installation further comprising means for connecting said overheating avoidance bottle to said steam heating chamber outlet for receiving a portion of the condensed heating steam from the cooker such that condensed heating steam accumulates therein, and said compressor stage outlet is connected to said overheating avoidance bottle so as to bubble through the condensed steam in said overheating avoidance bottle, and means for feeding the next compressor stage inlet with steam from said overheating avoidance bottle.

* * * * *